United States Patent [19]
Sandvik et al.

[11] Patent Number: 4,997,204
[45] Date of Patent: Mar. 5, 1991

[54] PASSIVE SAFETY HARNESS

[75] Inventors: Lars V. Sandvik, Vargarda; Svante O. Mogefors, Alingsas, both of Sweden

[73] Assignee: General Engineering (Netherlands) B.V., Utrecht, Netherlands

[21] Appl. No.: 379,800

[22] Filed: Jul. 17, 1989

[30] Foreign Application Priority Data

Jul. 18, 1988 [SE] Sweden ............................ 8802663

[51] Int. Cl.⁵ ............................................. B60K 21/10
[52] U.S. Cl. ..................................... 280/802; 280/804
[58] Field of Search ........................ 280/802, 803, 804

[56] References Cited

U.S. PATENT DOCUMENTS

| | | | |
|---|---|---|---|
| 3,860,260 | 1/1975 | Kazaoka et al. | 280/804 |
| 3,889,971 | 6/1975 | Kazaoka et al. | 280/804 |
| 4,175,773 | 11/1979 | Miller | 280/804 |
| 4,363,500 | 12/1982 | Ogawa | 280/804 |
| 4,387,912 | 6/1983 | Moriya et al. | 280/804 |
| 4,437,684 | 3/1984 | Moriya et al. | 280/804 |
| 4,542,919 | 9/1985 | Else | 280/804 |

FOREIGN PATENT DOCUMENTS 2065453 12/1980 United Kingdom .

*Primary Examiner*—Kenneth R. Rice
*Attorney, Agent, or Firm*—Spencer & Frank

[57] ABSTRACT

A three-point safety harness for use in a motor vehicle consists of two safety belts, each having its own individual retractor mechanism, the retractor mechanisms being mounted on the side of the relevant seat which is furthest from the associated door of the vehicle. One safety belt extends to a carriage movable along a rail mounted on the roof of the motor vehicle extending over the door opening. This safety belt is to form a chest strap. The other safety belt extends to a carriage movable along a rail formed in the door of the motor vehicle. This is the lap strap. The two straps are connected together by means of a slidable element which defines a passage or passages through which the safety belts pass in a sliding manner. The safety belt that forms the lap strap has a thickened portion which cannot pass through the said element.

The safety harness if of the "passive" kind and the arrangement ensures that the belts are kept free of the seat when the door is open and the person using the harness is getting into or out of the motor vehicle.

13 Claims, 2 Drawing Sheets

PASSIVE SAFETY HARNESS

BACKGROUND OF THE INVENTION

This invention relates to a passive three-point safety harness for use in a motor vehicle and more particularly relates to a three-point safety harness which has an arrangement to guide the safety belts that form the harness.

A typical passive three-point safety harness for use in a motor vehicle comprises two safety belts each with its own retractor mechanism or reel. One safety belt is to form a chest or shoulder belt and the other is to form a lap or waist belt. Both the retractor mechanisms are located on the side of the seat which is furthest from the associated door of the motor vehicle. The free end of the lap belt is secured to a mounting provided on the interior of the door of the vehicle which is located adjacent the relevant seat. The free end of the chest or shoulder belt is secured to a mounting which is movable along a rail mounted in the roof of the vehicle extending over the door opening.

A passive three-point safety harness, of the type described above, is constructed and arranged so that, when the door of the vehicle closes after a person has sat on the seat, the various safety belts are automatically positioned to extend across the lap and across the chest of the person sitting on the seat, with the mounting of the chest or shoulder belt being moved along the rail. The harness will then restrain the person in the seat in the event that an accident arises. However, the harness is also arranged to "open" or withdraw from the person sitting on the seat automatically in response to a certain signal, for example when the vehicle door opens.

The free end of the lap belt is often secured to a mounting which is movable along a rail or track mounted on the inside of the vehicle door, the mounting being adapted to move along the rail when the door opens and closes in a similar manner to that in which the mounting of the end of the shoulder belt on the rail provided in the vehicle roof is displaceable along the rail. It will be appreciated that when the mountings are each at one end of their respective rails the harness is in the "closed" state in which it embraces and retains a person in the vehicle seat, and when the mountings at the opposite ends of their respective rails, the harness is "open". The movements of the mountings are controlled by an appropriate mechanism which is adapted to be actuated, for example, in response to opening and closing of the door of the vehicle, or in response to the switching on or off of the ignition.

The problem that has arisen in prior-proposed three-point safety harnesses of the type discussed above is that when the harness is in the "open" condition the lap belt is either lying on or extending immediately above the seat. This makes it difficult for a person to enter into the vehicle, since the person must lift up this portion of safety belt as the person climbs into the vehicle.

Prior proposals have been made to overcome this particular problem. One example of such a prior proposal is disclosed in DE-OS 2260243, which discloses the use of a special arm which holds up the lap belt when the harness is in the "open" condition. However, such an arm is expensive to produce and assemble, and also takes up a considerable amount of space in the motor vehicle. It is also known to use an arrangement which effectively lifts the lap belt, this being in the form of a hoop or ring which is secured to a fixed position to the shoulder belt, and through which the lap belt can extend in a sliding manner. Arrangements of this kind are described in DE-OS 2260243 and DE-OS 2263291. These harnesses do raise the lap belt in a satisfactory way when the harness is "open" but have the disadvantage of fitting only a person of a particular size when the harness is "closed". If a smaller person occupies the seat the chest or shoulder belt is insufficiently tensioned since the hoop or ring which is connected to the shoulder belt prevents the belt from being retracted sufficiently into the reel, while if a larger person sits on the seat the hoop or ring contacts the body of that person and may cause irritation.

U.S. Pat. No. 3 889 971 discloses another similar arrangement, but in this arrangement the retractor reel for the lap belt is mounted on the door, and is not mounted on the side of the seat which is furthest from the associated door of the vehicle. This Specification discloses the use of a ring which serves to combine the two belts at their middle portions but provides no teaching as to the nature of the ring.

OBJECT OF THE INVENTION

The present invention seeks to provide a three-point safety harness which is cheap to produce and easy to assemble, and in which the lap belt is maintained elevated above the seat when the harness is in the "open" condition.

BRIEF SUMMARY OF THE INVENTION

According to one aspect of this invention there is provided a passive three-point safety harness in a motor vehicle, said motor vehicle having a seat upon which a person may sit and a door by means of which a person may gain access to the seat, the safety harness comprising a first safety belt to form a lap belt and an associated retractor reel or mechanism, a second safety belt to form a chest or shoulder belt and an associated retractor mechanism or reel, the retractor mechanisms or reels being disposed on that side of the seat which is furthest from the door, a mounting on the inside of the door to which the free end of the lap belt is secured, a mounting displaceably mounted on the vehicle roof above the door, for movement axially of the vehicle, the free end of the shoulder belt being secured to the said mounting, a collar through which portions of both the first belt and the second belt can extend, the collar being so dimensioned that each belt can pass freely through the collar, the arrangement being such that in the "closed" condition of the harness the collar is located at a position substantially level with or below the plane defined by the top of the seat, one of the belts having means to engage the collar and move the collar during the extraction of the belt from the associated reel from the said position level with or below the plane of the seat to a position above such plane so that the lap belt is raised clear of the seat.

Preferably the first safety belt and the second safety belt extend close together in parallel paths, with the belts being located in parallel planes in the region where the belts emerge from the retractor mechanisms or reels.

Conveniently the first belt, which is to form the lap belt, has a part thereon adapted to engage and move the collar during the extraction of the belt from the associated retractor mechanism or reel upon opening of the harness.

The part may be a thickened part on the first belt, which may be a stitched seam.

Preferably the collar is freely movable on the belt beyond the said part as seen from the reel.

Conveniently at a distance from the part beyond the collar, as seen from the reel, a further engaging part adapted to engage the collar is provided on the first belt, to engage the collar and guide it back towards the retractor mechanism or reel when the belt is retracted thereinto.

Preferably the collar is formed with two channels, one channel receiving the first safety belt and the other channel receiving the second safety belt.

Advantageously the collar is adapted to maintain the first belt and the second belt with a very small spacing therebetween.

In an alternative embodiment the second belt has, between the retractor mechanism or reel associated therewith, and the collar, a part adapted to engage and move the collar during extraction of the belt from the associated retractor mechanism or reel upon opening of the harness.

In a preferred embodiment of the invention both the lap belt and the shoulder belt can move freely through the collar during the "opening" of the harness and the collar may thus be moved by either the shoulder belt or the lap belt on extraction thereof from the relevant retractor mechanism or reel. Either belt can be retracted into the relevant retractor mechanism or reel to the required extent without being hindered in any way by the collar. Thus the harness can always engage correctly with the body of the person who is to be restrained by the harness. In the preferred embodiment the lap belt and the shoulder belt are adapted to move parallel to and adjacent one another in parallel planes, when they are extracted from the retractor mechanisms and thus the collar can, in the "closed" condition of the harness, readily be moved to a position very near the retractor mechanisms. Thus the collar does not contact the body of the person wearing the harness. Movement of the collar can be produced automatically by virtue of the fact that the belts diverge from one another on that side of the collar remote from the reels when the harness is in the "closed" condition, and thus the collar will tend to move readily along the belts to a position adjacent the retractor reels.

BRIEF INTRODUCTION TO THE DRAWINGS

FIG. 1 is a diagrammatic view of a passive three-point safety harness in accordance with the invention, the harness being mounted in a motor vehicle and being shown in the "open" condition, and FIG. 2 is a perspective view to an enlarged scale of a part of the arrangement illustrated in FIG. 1.

DESCRIPTION OF PREFERRED EMBODIMENT

Figure 1:
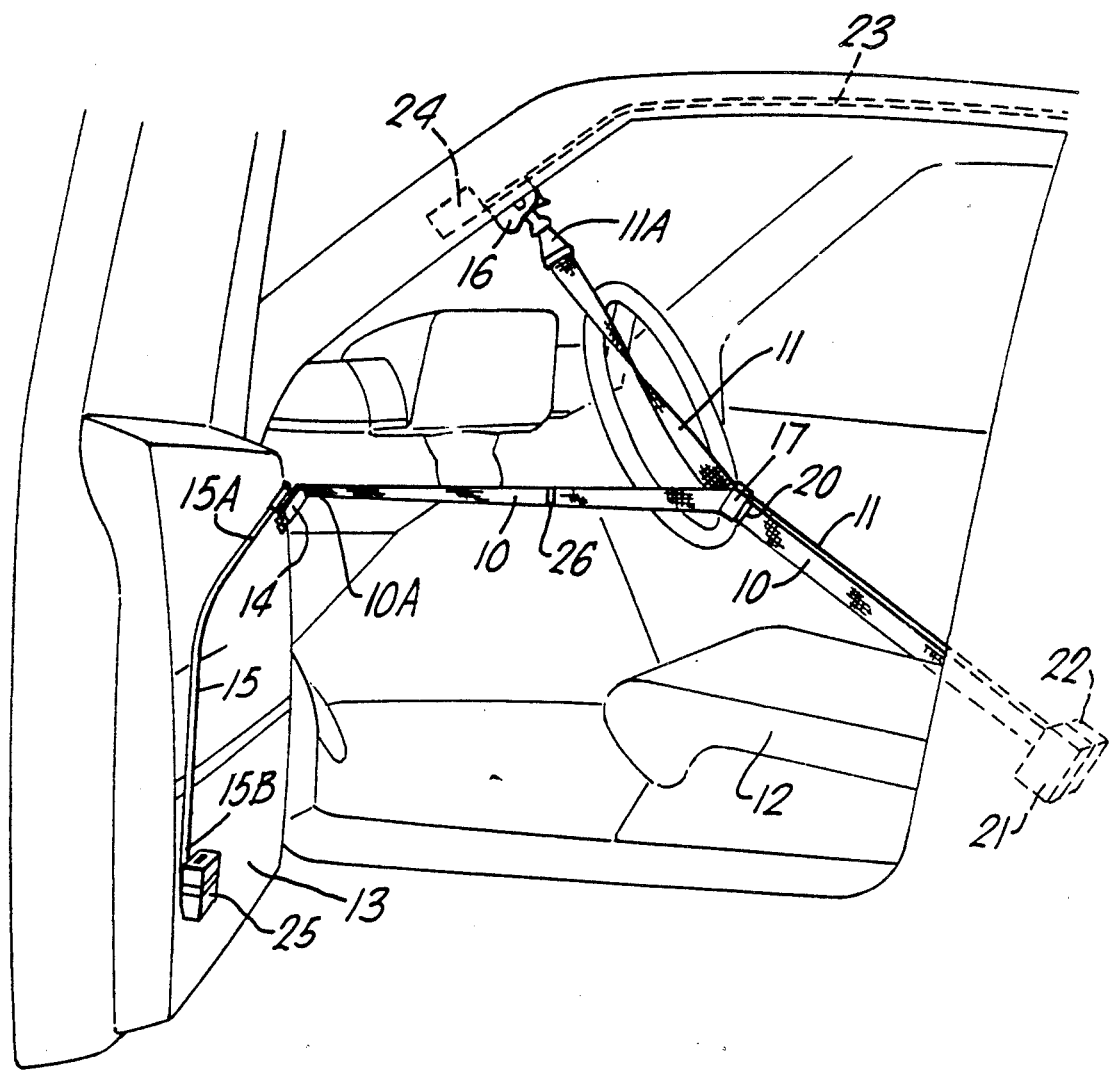

FIG. 1 illustrates a passive three-point safety harness installed in a motor vehicle. The harness comprises a lap belt 10 and a chest or shoulder belt 11, each associated with a respective retractor mechanism or reel. The reels are disposed on the floor of the motor vehicle adjacent the inner side of the seat 12 of the motor vehicle, that is to say adjacent the side of the seat which is remote from a door 13 which is associated with the seat 12. The retractor mechanisms are illustrated in phantom 21,22. The retractor mechanisms 21,22 are so arranged that the belts 10,11 move out of the reels in parallel planes which are close together. Thus the wide faces of the belts are adjacent one another and facing one another.

The free end 10A of the lap belt 10 is secured to a mounting 14 which is displaceably mounted upon a rail or track 15 which in turn is secured to the inside of the door 13. The mounting 14 may be moved between the ends 15A and 15B of the rail 15. When the mounting is at the top front end 15A of the rail the harness is "open" and when the mounting 14 is at the bottom rear end 15B of the rail the mounting is in the "closed" condition.

The free end 11A of the shoulder belt is secured to a mounting 16 which is mounted for displaceable movement along a rail or track 23, shown in phantom, which is mounted in the roof of a motor vehicle extending over the door opening provided to accommodate the door 13. The rail 13 extends length-wise of the vehicle and the mounting 16 is movable between the ends of the rail. When the mounting is at the front end of the rail, as illustrated in FIG. 1, the harness is "open" and when the mounting 16 is at the rear end of the rail 23 the harness is in the "closed" condition.

The mountings 14 and 16 are moved by means of electric motors 24,25 (shown in phantom) and associated cords or strings or the like. The driving motors are controlled by a switch actuated, for example, by the opening and closing of the door although the switch may be actuated in response to operation of the ignition of the motor vehicle.

It is to be observed from FIG. 1 that both the lap belt 10 and the chest or shoulder belt 11 pass through a collar 17. The collar 17 can be seen more clearly in FIG. 2. The collar 17 is formed with two parallel rectangular section channels 18,19 extending through the collar. The channel 18 is dimensioned to receive the shoulder belt 11 and the channel 19 is dimensioned to receive the lap belt 10. The channels 18 and 19 are disposed close to each other so that the belts 10 and 11 only have a minimal separation from each other in the region of the channel. The planes defined by the channels are parallel with each other. The channels 18 and 19 are so dimensioned that each belt 10 or 11 can extend freely through the relevant channel with a very small amount of friction. The lap belt 10 has a thickened portion 20 which extends transversely across the belt and which is of such a thickness as to prevent the thickened part 20 from passing through the channel 19 provided in the collar. In the illustrated embodiment the thickened part 20 is formed by a seam stitched across the folded-back part of the belt. However, the dimension of the belt may be adjusted in other ways.

When the belt 10 is extracted from the associated retractor mechanism 21, the collar 17 is engaged by the thickened part 20 of the belt and is thus moved with the belt.

It is to be understood that the thickened part 20 of the belt 10 is not so thick that it cannot be retracted into the reel, and thus the belt 10 can be substantially totally retracted into the reel or retractor mechanism 21 when required.

The illustrated three-point harness operates as follows.

When the harness is in the "closed" condition and a person is restrained by the harness collar, the collar 17 is located near the retractor reels 21,22 at the point where the belts 10 and 11 emanate from the reels. Since the belt portions tend to diverge after passing through the collar, the collar tends to be forced back towards the retractor reels. The collar 17 is then at a position which is level with or below the plane of the seat 12. Thus the collar cannot touch a person restrained by the described harness.

Figure 2:
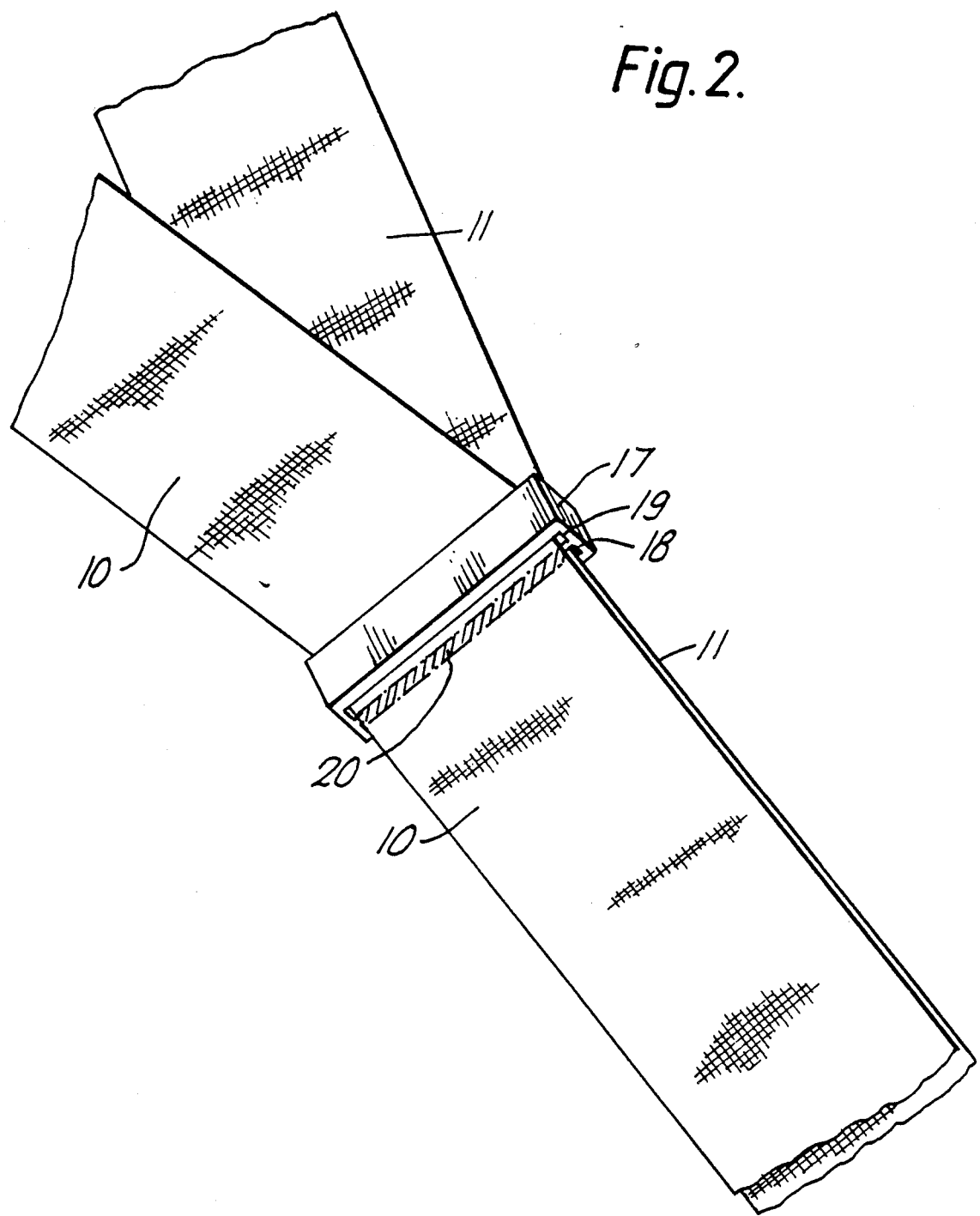

It will be appreciated that the belts 10 and 11 extending through the collar 17 initially extend with the two belts lying in planes that are substantially parallel to one another, between the retractor mechanisms 21 and 22 and the collar 17, with their wide sides facing each other, as shown towards the right-hand lower part of FIG. 2. After passing through the collar 17 the belts 10 and 11 immediately diverge. The shoulder belt 11 continues upwards to its roof mounting and the lap belt 10 extends above the seat and towards its door mounting. The mountings 14 and 16 are at the rear ends, respectively, of their rails 15 and 23. Because of the effect of the automatic belt retractors 21,22 the shoulder belt and the lap belt engage relatively tightly around the body of the person restrained by the harness.

To open the harness the person restrained thereby opens the vehicle door beside the seat, for example, and subsequently the mountings 14 and 16 are moved automatically to their front positions on the rails 15 and 23. During this procedure portions of the belt are withdrawn from the retractor mechanism 21 and 22. When the thickened part 20 of the lap belt 10 engages the collar 17, the collar 17 moves forward together with the belt 10, so long as the belt 10 continues to be extracted from the retractor mechanism 21. The collar 17 is therefore moved up to a position above the plane of the seat. Since the collar is also engaged by the lap belt, and since the lap belt extends relatively tautly between the retractor mechanism 22 and the mounting 16 which is at the front end of the rail 23, the collar 17 is moved up to a position above the plane of the seat 12, thus raising the lap belt 10 clear of the seat sufficiently for the person previously restrained by the harness to be able to get out of the vehicle without being hindered by the harness.

It will be appreciated that, in a similar way, the lap belt is raised to an elevated position when the vehicle door is opened when a person wishes to enter the vehicle and sit on the seat 12. Thus the described arrangement ensures that a person utilizing the three-point anchorage harness is not hindered in any way either when getting into or when getting out of the motor vehicle in which the harness is fitted.

As illustrated in FIG. 1 the lap belt 10 can, if desired, have a second thickened part 26, corresponding to the thickened part 20 disposed some distance beyond the thickened part 20 as seen from the retractor mechanism or reel 21. The second thickened part 26 again has such dimensions that the thickened part cannot pass through the channel 19 defined by the collar 17. It will be appreciated, therefore, that the collar is free to move only between the two thickened parts 20,26. The second thickened part is effected to move the collar back approximately as far as the level of the top of the seat when the belt 10 is retracted into the retractor mechanism or reel 21. The second thickened part 26 can, like the first thickened part 20, take the form of a seam extending across a folded-back portion of the belt.

It is to be appreciated that the thickened parts 20, and 26 may, in alternatively embodiments of the invention, each comprise a respective separate element which can, if required, be movable on the belt, but which is preferably secured to the belt in a relatively firm way.

Although only one embodiment of the belt guiding arrangement according to the invention has been described, many variations and modifications are possible within the scope of the invention. For example, the collar can be formed with just a single channel dimensioned to receive both the belts 10 and 11, so that both the belts pass through the same channel. The mounting for the lap belt need not be displaceable on the vehicle door in the manner shown, but may be in a predetermined fixed position on the vehicle door. However, it is preferred for the free end of the lap belt to be connected to a mounting which is displaceable along a rail provided on the vehicle door in the manner shown, since this simplifies the raising of the lap belt above the seat.

In an alternatively embodiment of the invention the thickened part may, instead of being provided on the lap belt 10, be provided on the chest or shoulder belt 11. It is preferred that the thickened part is on the belt which is most usually pulled out furthest from the retractor reel.

What is claimed is:

1. A passive three-point safety harness in a motor vehicle, said motor vehicle having a seat upon which a person may sit and a door by means of which a person may gain access to the seat, the safety harness comprising:
    a first safety belt to form a lap belt and an associated retractor reel or mechanism,
    a second safety belt to form a chest or shoulder belt and an associated retractor mechanism or reel,
    the retractor mechanisms or reels being disposed on that side of the seat which is furthest from the door,
    a mounting on the inside of the door to which the free end of the lap belt is secured,
    a mounting displaceably mounted on the vehicle roof above the door, for movement axially of the vehicle, the free end of the shoulder belt being secured to the said mounting,
    a collar through which portions of both the first belt and the second belt can extend, the collar being so dimensioned that each belt can pass freely through the collar,
    the arrangement being such that in the "closed" condition of the harness the collar is located at a position substantially level with or below the plane defined by the top of the seat,
    one of the belts having means to engage the collar and move the collar during the extraction of the belt from the associated reel from the said position level with or below the plane of the seat to a position above such plane so that the lap belt is raised clear of the seat.

2. An arrangement according to claim 1 wherein the first safety belt and the second safety belt extend close together in parallel paths, with the belts being located in parallel planes in the region where the belts emerge from the retractor mechanisms or reels.

3. An arrangement according to claim 1 wherein the first belt, which is to form the lap belt, has a part thereon adapted to engage and move the collar during the extraction of the belt from the associated retractor mechanism or reel upon opening of the harness.

4. An arrangement according to claim 3 wherein the said part to engage the collar is in the form of a thickened part on the first belt.

5. An arrangement according to claim 4 wherein the thickened part on the belt is in the form of a stitched seam.

6. An arrangement according to claim 3 wherein the collar is freely movable on the belt beyond the said part as seen from the reel.

7. An arrangement according to claim 3 wherein at a distance from the part beyond the collar, as seen from the reel, a further engaging part adapted to engage the collar is provided on the first belt, to engage the collar and guide it back towards the retractor mechanism or reel when the belt is retracted thereinto.

8. An arrangement according to claim 1 wherein the collar is formed with two channels, one channel receiving the first safety belt and the other channel receiving the second safety belt.

9. An arrangement according to claim 1 wherein the collar is adapted to maintain the first belt and the second belt with a very small spacing therebetween.

10. An arrangement according to claim 1 wherein the second belt has, between the retractor mechanism or reel associated therewith, and the collar, a part adapted to engage and move the collar during extraction of the belt from the associated retractor mechanism or reel upon opening of the harness.

11. An arrangement according to claim 10 wherein the part is in the form of a thickened part on the belt.

12. An arrangement according to claim 10 wherein the thickened part on the belt is in the form of a stitched seam.

13. An arrangement according to claim 1 wherein said mounting on the inside of the door is displaceably mounted, for movement axially of the vehicle.

* * * * *